United States Patent
Van Heugten (10) Patent No.: US 12,474,620 B2
(45) Date of Patent: Nov. 18, 2025

(54) BEAM STEERING DEVICES

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

(21) Appl. No.: 18/609,559

(22) Filed: Mar. 19, 2024

(65) Prior Publication Data

US 2024/0219807 A1 Jul. 4, 2024

Related U.S. Application Data

(63) Continuation of application No. 17/406,030, filed on Aug. 18, 2021, now Pat. No. 11,940,711, which is a
(Continued)

(51) Int. Cl.
*G02F 1/295* (2006.01)
*G02B 27/01* (2006.01)
(Continued)

(52) U.S. Cl.
CPC ....... *G02F 1/2955* (2013.01); *G02B 27/0172* (2013.01); *G02C 7/022* (2013.01);
(Continued)

(58) Field of Classification Search
CPC ........ G02F 1/2955; G02F 1/295; G02F 1/294; G02F 1/292; G02F 1/291; G02F 1/29;
(Continued)

(56) References Cited

U.S. PATENT DOCUMENTS

| 5,018,835 A | 5/1991 | Dorschner |
| 5,253,003 A | 10/1993 | Fujii et al. |

(Continued)

FOREIGN PATENT DOCUMENTS

| CN | 1320223 A | 10/2001 |
| CN | 102271900 A | 12/2011 |

(Continued)

OTHER PUBLICATIONS

European Exam Report in European Application No. 19887630.2 dated Jan. 25, 2023, 5 pages.
(Continued)

*Primary Examiner* — Travis S Fissel
(74) *Attorney, Agent, or Firm* — Smith Baluch LLP (57) ABSTRACT

A beam steering device includes a substrate with a first refractive index that defines a cavity, an electroactive material in the cavity that has a variable refractive index, and two sets of opposing overlays. The overlays in one set of opposing overlays are parallel to each other, while the overlays in the other set are tilted with respect to each other. This allows one or more electric fields between the overlays to be used to align the electroactive material in two different directions to change its refractive index, allowing for a faster speed of beam steering through refraction than conventional approaches.

13 Claims, 7 Drawing Sheets

Related U.S. Application Data continuation of application No. 16/783,863, filed on Feb. 6, 2020, now Pat. No. 11,126,061, which is a continuation of application No. PCT/US2019/062110, filed on Nov. 19, 2019.

(60) Provisional application No. 62/769,052, filed on Nov. 19, 2018.

(51) Int. Cl.
  *G02C 7/02* (2006.01)
  *G02C 7/04* (2006.01)
  *G02C 7/08* (2006.01)
  *G02F 1/1335* (2006.01)

(52) U.S. Cl.
  CPC .............. *G02C 7/041* (2013.01); *G02C 7/083* (2013.01); *G02F 1/133502* (2013.01); *G02F 2203/24* (2013.01)

(58) Field of Classification Search
  CPC ........... G02F 1/133502; G02F 2203/24; G02B 6/4214; G02B 27/0179; G02B 27/0176; G02B 27/0172; G02B 27/017; G02B 27/0149; G02B 27/0101; G02B 27/01; G02C 7/083; G02C 7/041; G02C 7/022
  USPC ................. 345/7–9; 349/11, 15; 348/115, 42, 348/51–60; 359/13–14, 618, 462–477, 359/629–633
  See application file for complete search history.

(56) References Cited

U.S. PATENT DOCUMENTS

| | | | |
|---|---|---|---|
| 5,253,033 A | 10/1993 | Lipchak et al. | |
| 5,615,029 A | 3/1997 | Moddel et al. | |
| 5,682,210 A | 10/1997 | Weirich | |
| 6,084,651 A | 7/2000 | Yamahara et al. | |
| 6,169,594 B1 | 1/2001 | Aye et al. | |
| 6,295,113 B1 | 9/2001 | Yang | |
| 6,310,675 B1 | 10/2001 | Yaniv | |
| 6,441,947 B1 * | 8/2002 | Ionov | G02F 1/292 359/263 |
| 6,851,805 B2 | 2/2005 | Blum et al. | |
| 6,917,456 B2 | 7/2005 | Reboa et al. | |
| 7,018,040 B2 | 3/2006 | Blum et al. | |
| 7,195,353 B2 | 3/2007 | Blum et al. | |
| 7,758,187 B2 | 7/2010 | Amirparviz | |
| 8,096,654 B2 | 1/2012 | Amirparviz et al. | |
| 8,184,068 B1 | 5/2012 | Rhodes et al. | |
| 8,786,675 B2 | 7/2014 | Deering | |
| 9,375,885 B2 | 6/2016 | Pugh et al. | |
| 9,375,886 B2 | 6/2016 | Pugh et al. | |
| 9,933,620 B2 | 4/2018 | Heugten | |
| 10,247,947 B2 | 4/2019 | Heugten | |
| 10,473,935 B1 | 11/2019 | Gribetz et al. | |
| 10,732,416 B2 | 8/2020 | Van | |
| 11,126,061 B2 | 9/2021 | Heugten | |
| 2002/0044152 A1 | 4/2002 | Abbott et al. | |
| 2003/0016905 A1 | 1/2003 | Kondoh et al. | |
| 2004/0113867 A1 | 6/2004 | Tomine et al. | |
| 2006/0227067 A1 | 10/2006 | Iwasaki | |
| 2007/0220108 A1 | 9/2007 | Whitaker | |
| 2008/0002262 A1 | 1/2008 | Chirieleison et al. | |
| 2008/0284929 A1 | 11/2008 | Kimura | |
| 2009/0189974 A1 | 7/2009 | Deering | |
| 2009/0322861 A1 | 12/2009 | Jacobs et al. | |
| 2010/0001926 A1 | 1/2010 | Amirparviz et al. | |
| 2010/0045571 A1 | 2/2010 | Yamamoto | |
| 2010/0103368 A1 | 4/2010 | Amirparviz et al. | |
| 2010/0110372 A1 | 5/2010 | Pugh et al. | |
| 2010/0309295 A1 | 12/2010 | Chow | |
| 2012/0245444 A1 | 9/2012 | Otis et al. | |
| 2012/0277568 A1 | 11/2012 | Chiou et al. | |
| 2014/0313484 A1 | 10/2014 | Bogaert | |
| 2014/0368481 A1 | 12/2014 | Tomikawa | |
| 2015/0015814 A1 | 1/2015 | Qin | |
| 2015/0234221 A1 | 8/2015 | Anderson et al. | |
| 2015/0301338 A1 * | 10/2015 | Van Heugten | G02B 27/0172 345/8 |
| 2017/0192264 A1 * | 7/2017 | Anderson | G02F 1/295 |
| 2018/0052325 A1 | 2/2018 | Bohn | |
| 2019/0113757 A1 | 4/2019 | Heugten | |

FOREIGN PATENT DOCUMENTS

| | | |
|---|---|---|
| CN | 106959547 A | 7/2017 |
| CN | 108107572 A | 7/2020 |
| EP | 0562742 A1 | 9/1993 |
| EP | 3327486 A1 | 12/2019 |
| JP | H06138499 A | 5/1994 |
| JP | H08205052 A | 8/1996 |
| JP | H10246885 A | 9/1998 |
| JP | H11127402 A | 5/1999 |
| JP | 2000193925 A | 7/2000 |
| JP | 2001027740 A | 1/2001 |
| JP | 2002350795 A | 12/2002 |
| JP | 2004004647 A | 1/2004 |
| JP | 2005311823 A | 11/2005 |
| JP | 2006292883 A | 10/2006 |
| JP | 2013541049 A | 11/2013 |
| JP | 2016500450 A | 1/2016 |
| JP | 2018013566 A | 1/2018 |
| JP | 2018112625 A | 7/2018 |
| WO | 2006015315 A3 | 4/2007 |
| WO | 2008109867 A2 | 9/2008 |
| WO | 2009066446 A1 | 5/2009 |
| WO | 2012051167 A1 | 4/2012 |
| WO | 2012051223 A2 | 4/2012 |

OTHER PUBLICATIONS

Examiner's Report in Canadian App. No. 3, 120,516, dated Sep. 21, 2023, 3 pages.

Extended European Search Report in European Application No. 19887630.2 dated Jul. 26, 2022, 11 pages.

First Office Action and Search Report with translation in Chinese Application No.201980076036.9 dated Feb. 3, 2023, 12 pages.

International Search Report and Written Opinion in International Patent Application No. PCT/US2019/062110 mailed Jan. 24, 2020, 13 pages.

Lingley, "A single-pixel wireless contact lens display", Nov. 22, 2011, 8 pages, Journal of Micromechanics and Microengineering, 21 (2011) 125014.

Office Action in Korean Application No. 10-2022-7029131 with translation, dated May 16, 2023, 10 pages.

Parviz, "For your eye only." IEEE Spectrum 46.9 (Sep. 2009): 36-41.

Second Office Action with translation in Chinese Appl No. 201980076036.9 dated Oct. 7, 2023, 9 pages.

* cited by examiner

BEAM STEERING DEVICES

CROSS-REFERENCE TO RELATED APPLICATION

This application is a continuation of U.S. application Ser. No. 17/406,030 filed Aug. 18, 2021, title "BEAM STEERING DEVICES," which is a continuation of U.S. application Ser. No. 16/783,863 filed Feb. 6, 2020, titled "BEAM STEERING DEVICES," which is a bypass continuation of PCT Application No. PCT/US2019/062110 filed Nov. 19, 2019, titled "BEAM STEERING DEVICES," which claims priority to U.S. Provisional Application No. 62/769,052 filed Nov. 19, 2018, titled "FAST BEAM STEERING DEVICE USING MULTI-DIMENSIONAL ELECTRIC FIELDS AND OVER-DRIVING," the entire disclosures of which are incorporated herein by reference.

BACKGROUND

Current liquid crystal-based beam steering devices use an electric field to alter the orientation of the liquid crystal molecules. The liquid crystal molecules align with the direction of the electric field. Anchoring forces created by an alignment layer return the liquid crystal molecules to their original orientation when the electric field is removed. Increasing the amplitude of the electric fields increases the speed of rotation of the liquid crystal molecules, but the alignment layer forces are fixed, so the change in orientation when the electric field is removed occurs relatively slowly, regardless of the field amplitude. This causes a conventional liquid-crystal beam steering device to switch slowly from an "ON" state to an "OFF" state, regardless of how quickly the device switches from "OFF" to "ON."

SUMMARY

A beam steering device includes a substrate defining a cavity and having a first refractive index, and an electroactive material, disposed within the cavity and having a variable refractive index. The beam steering device also includes a first overlay, coupled to the substrate, to receive an incident light beam orthogonal to a first plane of the first overlay and to couple the incident light beam into the electroactive material. The beam steering device also includes a second overlay coupled to the substrate and defining a second plane tilted with respect to the first plane to define a tilt angle between the first plane and the second plane. The second overlay receives the incident light beam from the electroactive material and outputs, after refraction, the incident light beam as an output light beam.

A method for projecting a light beam on a retina of a user via eyewear worn by the user includes receiving, via a network overlay of the eyewear, image data and/or video data from a remote device. The method further includes converting, via a source of the eyewear, the image data and/or video data into a light beam. The method further includes coupling, into a beam steering device of the eyewear, the light beam as an incident light beam orthogonal to a first plane of a first overlay of the beam steering device. The first overlay is coupled to a substrate of the beam steering device. The substrate has a first refractive index and defines a cavity having an electroactive material disposed therein, the electroactive material exhibiting a variable refractive index. The method also includes receiving, at a second overlay of the beam steering device, the incident light beam from the electroactive material, the second overlay defining a second plane titled with respect to the first plane to define a tilt angle. The method further includes applying a first electric field to the electroactive material between the first overlay and the second overlay, and a second electric field to the electroactive material between a third overlay and a fourth overlay of the beam steering device. The third overlay and the fourth overlay each define a plane orthogonal with respect to the first plane, such that the electroactive material attains a second refractive index based on a strength of the first electric field and the second electric field. The method also includes outputting, after refraction by the second overlay, the incident light beam as an output light beam onto the retina of the user.

A scanning system includes a set of beam steering devices in cascade. Each beam steering device includes a substrate defining a cavity and having a first refractive index and an electroactive material, disposed within the cavity and having a variable refractive index. Each beam steering device further includes a first overlay, coupled to the substrate, to receive an incident light beam orthogonal to a first plane of the first overlay and to couple the incident light beam into the electroactive material. Each beam steering device further includes a second overlay coupled to the substrate and defining a second plane tilted with respect to the first plane to define a tilt angle between the first plane and the second plane, to receive the incident light beam from the electroactive material and to output, after refraction, the incident light beam as an output light beam. A first beam steering device receives the incident light beam and outputs the output light beam as a first output light beam. Each subsequent beam steering device receives the output light beam of a previous beam steering device as its input light beam. Each beam steering device outputs is output light beam as refracted along a different axis than each other beam steering device of the set of beam steering devices.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
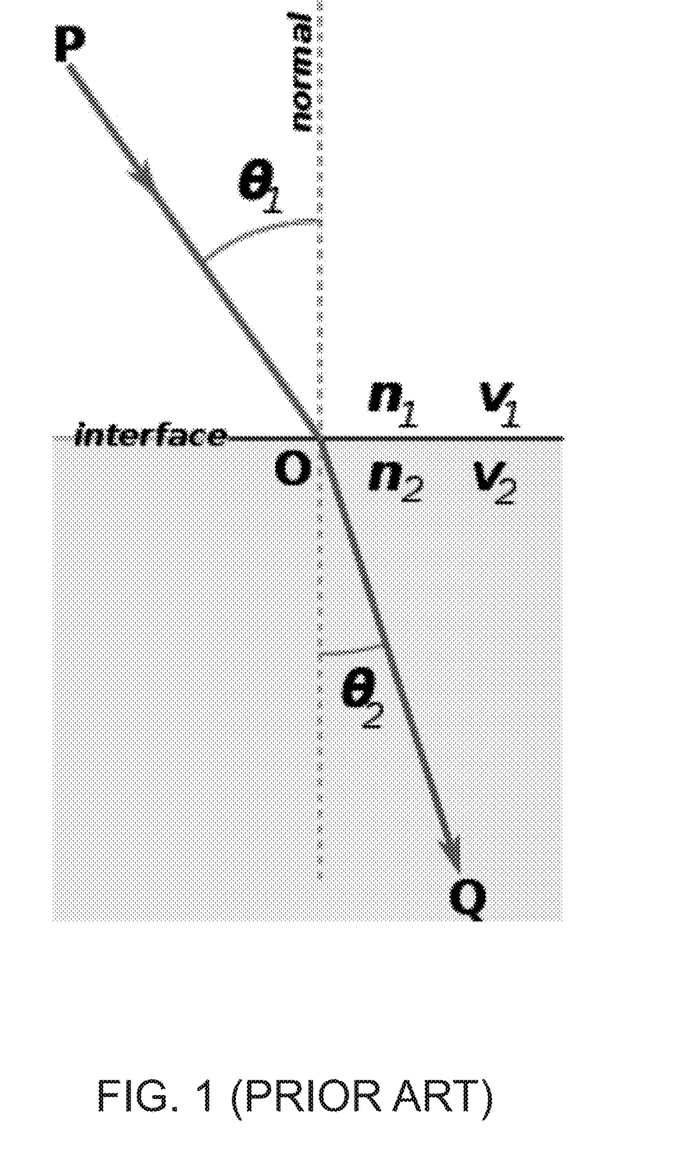
FIG. 1 illustrates light refraction according to Snell's Law.

Light beams can be redirected, or steered, by utilizing materials where the effective birefringence may be changed, resulting in a change in the index of refraction. When light travels through one material and encounters another material of a different index of refraction, its speed changes as it propagates into the other material. If the light exits one material and enters the next material at an angle perpendicular to the overlay between the materials, the light will change speed but not propagation direction. However, if the light enters the second material at an angle with respect the overlay between the materials, the propagation direction of the light will change too. This phenomenon is called refraction and is described by Snell's Law FIG. 1 illustrates refraction of light at the interface/boundary between two media of different refractive indices $n_2$ and $n_1$, with $n_2 > n_1$. Since the velocity in the second medium ($v_2$) is lower than in the first medium ($v_1$), i.e., $v_2 < v_1$, the angle of refraction $\theta_2$ is less than the angle of incidence $\theta_1$. Said another way, the light ray/beam in the higher-index medium is closer to the surface normal. Snell's law (also known as Snell-Descartes law and the law of refraction) is a formula used to describe the relationship between the angles of incidence and refractive indexes, when referring to light or other waves passing through a boundary between two different isotropic media, such as water, glass, or air. In optics, Snell's law is used in ray tracing to compute the angles of incidence or refraction, and in experimental optics to find the refractive index of a material.

Snell's law states that the ratio of the sines of the angles of incidence and refraction is equivalent to the ratio of phase velocities in the two media, or equivalent to the reciprocal of the ratio of the indices of refraction:

$$\frac{\sin\theta_1}{\sin\theta_2} = \frac{v_1}{v_2} = \frac{n_2}{n_1}$$

with each $\theta$ as the angle measured from the normal of the boundary, v as the velocity of light in the respective medium (SI units are meters per second, or m/s), $\lambda$ as the wavelength of light in the respective medium and n as the refractive index (which is unitless) of the respective medium.

In an example inventive beam steering device, two different materials are abutted to one another at an interface/boundary. A light beam, or other electromagnetic beam, encounters this interface at an angle. At least one of the materials is an electroactive material that can change its index of refraction. At one value of the index of refraction of the electroactive material at this interface the beam changes its angle of direction by one amount, while at a second value of an index of refraction the light beam changes its angle of direction by a second amount. If the index of refraction can be changed in discrete steps, then the light beam can be redirected in discrete angles. If the index of refraction can be changed in an analog or continuous manner, then the light beam's angle can also be changed in an analog/continuous manner.

Electroactive materials, for example, liquid crystals (LC), possess the ability to change their index of refraction when the molecules are oriented in certain directions, i.e., they have a variable refractive index. If, for example, a nematic liquid crystal with elongated molecules that are oriented such that the long axis of the molecules is perpendicular to the direction of the light traveling through them, the index of refraction may be 1.7 if the polarization of light is parallel to the long axis of the molecules. If the molecules are then reoriented such that the long axis is parallel to the direction of the light traveling through them, the index of refraction may change to 1.5.

Figure 2A:
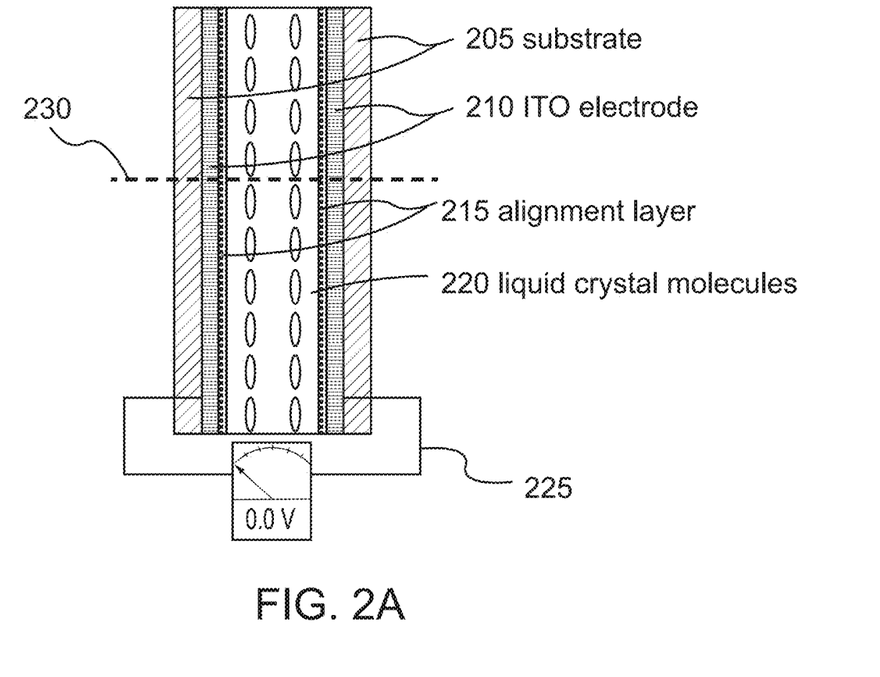
FIG. 2A illustrates a beam steering device having a liquid crystal material with its molecules aligned perpendicular to the device's optical axis in the absence of an electric field.
Figure 2B:
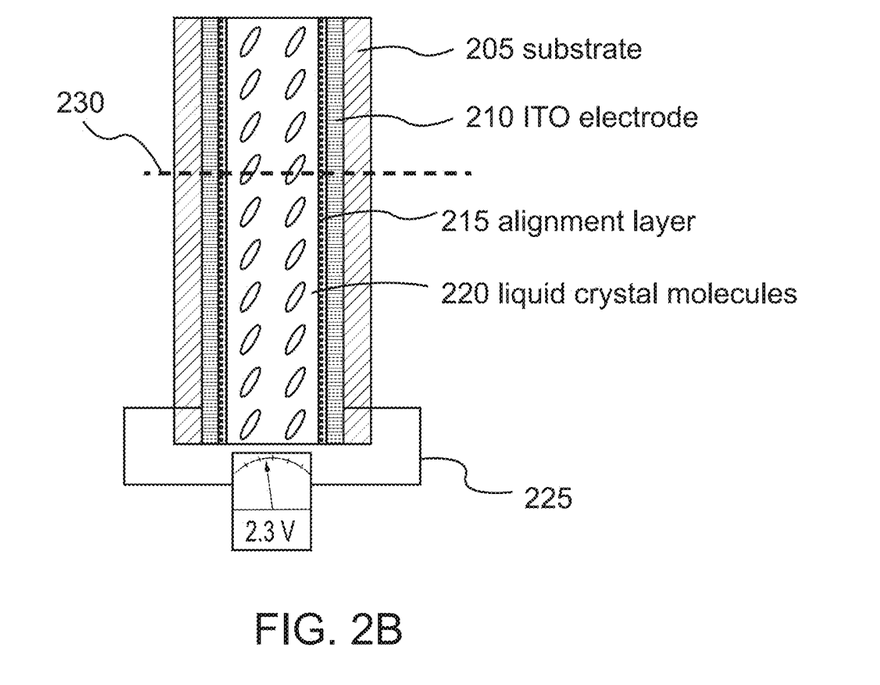
FIG. 2B illustrates the beam steering device of FIG. 2A upon application of an electric field along the device's optical axis, with the molecules of the liquid crystal material rotated with respect to the device's optical axis.
Figure 2C:
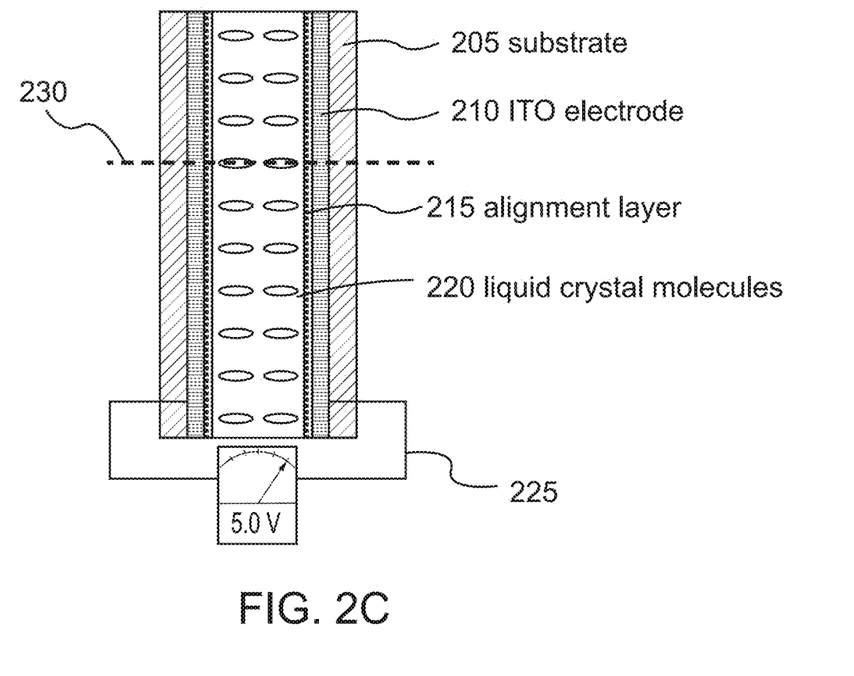
FIG. 2C illustrates the beam steering device of FIG. 2A upon application of an electric field along the device's optical axis with a higher voltage than in FIG. 2B, with the molecules of the liquid crystal material rotated more with respect to the device's optical axis.

FIGS. 2A-2C illustrate an example beam steering device 200 having substrates 205 placed parallel to each other with a small gap between them that can be less than about 1 µm, from about 1 µm to about 10 µm, greater than 10 µm, including all values and sub-ranges in between. An electrically conductive but optically transmitting material, for example, Indium Tin Oxide (ITO), is coated on the surfaces of the substrates that are facing each other. These electrically conductive layers are sometimes referred to as electrodes or electrode layers 210. Over the top of these electrodes is a layer of material that causes liquid crystal molecules to align parallel to the surface, or possibly vertically if using a negative dielectric liquid crystal. Negative dielectric liquid crystals are available from Merck in Darmstadt, Germany. Such an alignment surface may be polyimide that has parallel micro-grooves rubbed into its surface or other materials and processes to achieve the same effect, for example, UV-cured alignment materials produced by Rolic of Basel Switzerland, a BASF Company, or polyimides produced by Nissan Chemical of Japan. These surfaces are sometimes referred to as alignment layers 215. The combination of an electrode/electrode layer and its alignment layer can sometimes be referred to as an overlay.

FIG. 2A illustrates how, when no electric field is applied by a circuit 225 across the electrodes 210, the anchoring force of the alignment layer 15 causes the LC molecules 220 to align their long axes parallel to the substrates 205 and perpendicular to the optical axis 230 of the beam steering device 200. In this condition, the index of refraction of the LC material 220 is a first value, for example, n=1.7.

In FIG. 2B, a small electric field is applied by the circuit 225 across the electrodes 210, causing the long axis of the LC molecules 220 to partially rotate away from the alignment layers 15 and towards the direction of the electric field, which is perpendicular to the substrates 205 and parallel to the optical axis 230 of the beam steering device 200. When the electric field is of a relatively low value, for example, 0.5 volts, the change-of-rotation force of the alignment layers 215 upon the LC molecules 220 is greater than the force of the electric field, so the LC molecules 220 rotate by a relatively small amount. In this state, the long axes of the LC molecules 220 are aligned more towards the plane of the alignment layer 215 than in the direction of the electric field (i.e., perpendicular to rather than parallel to the substrates 205). In this situation, the index of refraction changes by a small amount its total permissible range, for example, it may change from 1.7 to 1.62. generally, an example permissible range in refractive index for any of the beam steering devices disclosed herein can be less than 0.25, from about 0.25 to about 0.40, or greater than 0.40, including all values and sub-ranges in between.

In FIG. 2C, a higher voltage than that applied in FIG. 2B is applied by the circuit 225, which creates a higher rotational force on the LC molecules 220 than the force being applied by the alignment layers 215. As a result, the long axes of the LC molecules 220 align themselves relatively more with the direction of the electric field, and parallel to the optical axis 230, than with the plane(s) of the alignment layers 215. In this situation, the index of refraction changes/reduces further, for example, it may change to 1.55. When the electric field is returned to a lower voltage, or zero voltage, the anchoring force of the alignment layers 215 returns the LC molecules 220 to their initial state of orientation shown in FIG. 2A.

The rate/speed of changing the orientation of the LC molecules from one where they are substantially parallel to the plane(s) of the alignment layers to substantially parallel to the direction of the electric field can be influenced by the level of the voltage applied. If a higher-than-required electric field is applied, i.e., higher than required to rotate the LC molecules to a maximum permissible degree of rotation, the rotation is faster than if the minimum-required voltage is applied for attaining the maximum permissible degree of rotation. Generally, the minimum-required voltage can be a voltage required for affecting rotation of the LC molecules, and can be from about 0.5 V to about 3 V. In some cases, the minimum-required voltage can be lower than 0.5 V, or can be higher than 3 V (e.g., 40 V or more), such as is the case for some LC materials.

For example, if a beam steering device requires 5 V to fully rotate the LC Molecules to their maximum permissible orientation (e.g., 90 degrees) with the electric field, the time to rotate from the alignment layer orientation to the electric field orientation may be, for example, 300 ms. However, if 10 V (i.e., greater than the minimum-required voltage of 5 V) were applied, the time to rotate will be lower, for example, as low as 100 ms. If 20 volts were applied, the time to rotate would be even lower.

In another example, if the voltage required to rotate the LC material from the alignment-layer orientation to midway between the two states (i.e., between alignment-layer orientation and electric-field orientation, as illustrated in FIG. 2B) is 2.3 V, and 2.3 V is applied, it may take, for example, 250 ms to complete this rotation. However, if a higher voltage is applied, such as 5 V, it may traverse this rotation in 100 ms. To take advantage of this response without rotating the LC molecules farther than desired, 5 V may be applied for 100 ms as the "speed" voltage, then switched to 2.3 V as the "holding voltage." These "speed up" methods/approaches are sometimes known as overdriving the LC material to attain a desired orientation. Despite overdriving, the speed at which the LC material returns towards its orientation with the plane of the alignment layer can be slow because the anchoring force of the alignment layer is weaker than the electric energy, and due to the elastic constants (e.g., the elastic modulus) of the LC material. For example, the molecules of a stiffer or more viscous material with a higher elastic modulus will likely be slower in changing their orientation to be with that of the alignment layer than one with a lower elastic modulus. The result is that the speed of switching the lens from the OFF position (i.e., when the LC material is aligned with the plane of the alignment layer) to an ON position (i.e., when the LC material is at least partially aligned with the direction of the electric field) may be increased by overdriving, but the speed of switching from ON to OFF cannot be increased in the beam steering device 200 by overdriving because the only force that reorients the LC material is the relatively weak force exerted by the alignment layer.

Beam Steering Devices

Disclosed herein are beam steering devices that can speed up the change in orientation of the liquid crystal molecules (and generally, any electroactive material that may be employed) when the orientation of the liquid crystal molecules is being adjusted in both directions. To accomplish this, two additional, similar substrates are attached to two substrates like those in FIGS. 2A-2C to form an LC cavity with a trapezoidal cross section, where the parallel sides are parallel to the device's optical axis. The alignment layer is optional for these additional substrates. One of the facets/substrates is not parallel to its opposite substrate and is instead at an angle or tilted with respect to it by, for example, less than about 1 degree, between about 1 degree and about 60 degrees, greater than 60 degrees, including all values and sub-ranges in between. The substrates can be assembled such that their respective electrode layers are electrically insulated from each other.

Figure 3A:
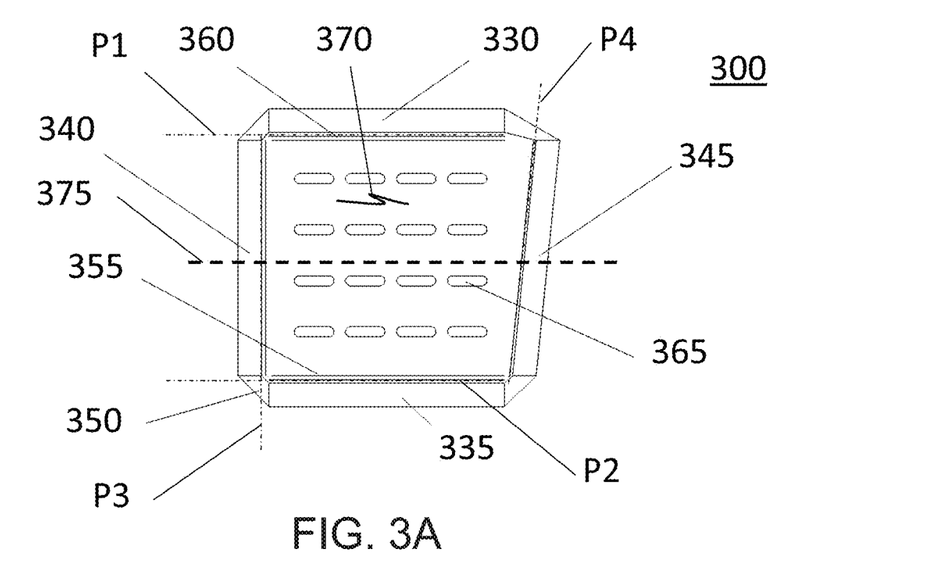
FIG. 3A shows an inventive beam steering device with an electroactive material whose molecules are aligned with the device's optical axis in the absence of an electric field.
Figure 3B:
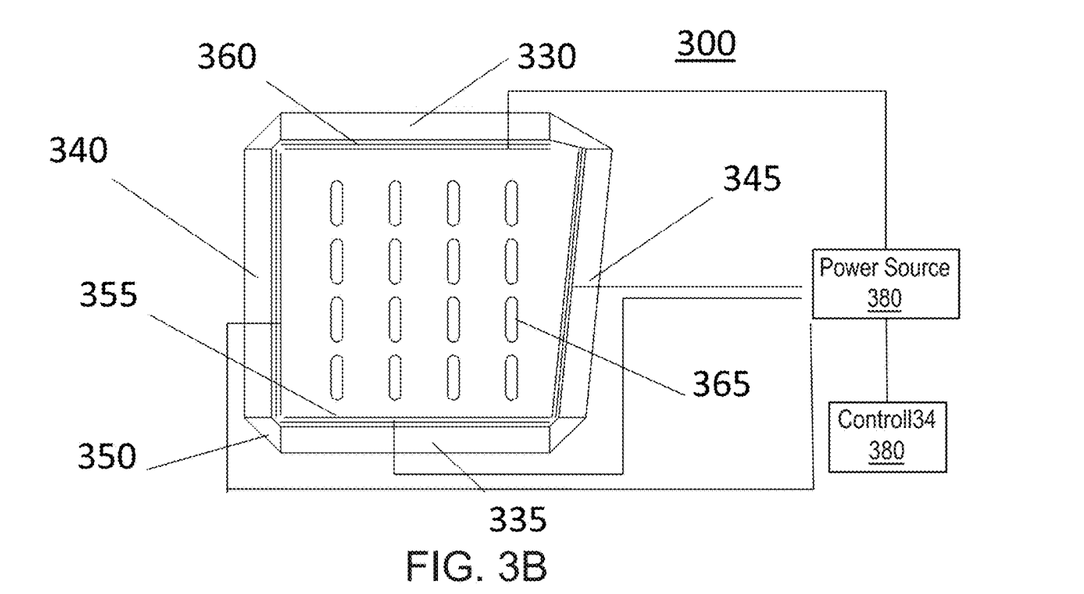
FIG. 3B illustrates the beam steering device of FIG. 3A upon application of an electric field, with the molecules of the liquid crystal material in a second alignment.
Figure 3C:
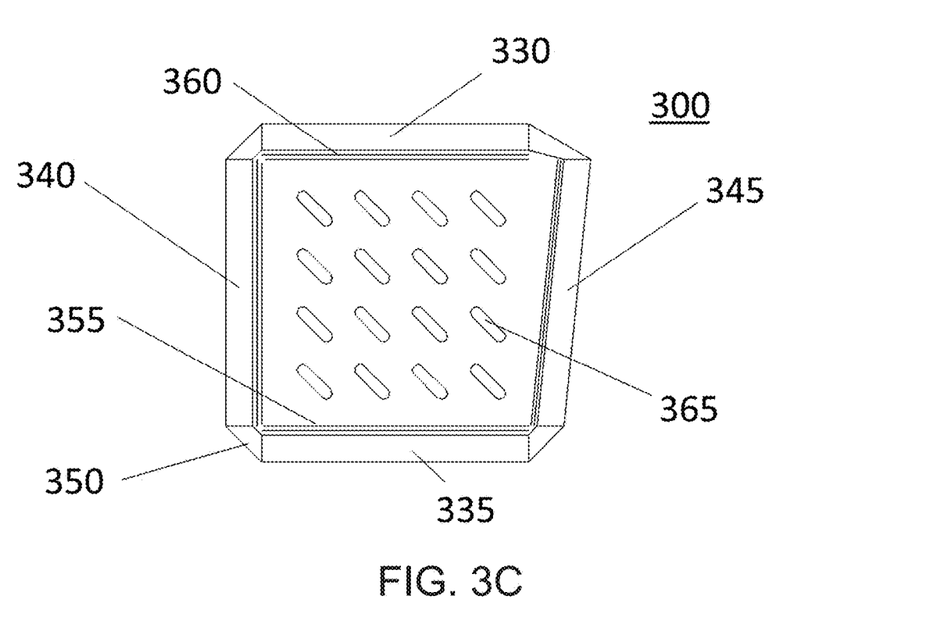
FIG. 3C illustrates the beam steering device of FIG. 3A upon application of an electric field with a higher voltage than in FIG. 3B, with the molecules of the liquid crystal material in a third alignment.

FIGS. 3A-3C illustrate a beam steering device 300 that includes a first overlay 330, a second overlay 335, a third overlay 340, and a fourth overlay 345 are shown. Each overlay may be coupled to a substrate, and may include an electrode layer 360 (e.g., composed of an electrically conductive and preferably optically transparent coating, such ITO, silver nanowires, PEDOT (poly(3,4-ethylenedioxythiophene), etc.) and an optional alignment layer 355 (e.g., composed of rubbed polyimide, though any suitable material capable of affecting the alignment of the electroactive material can be employed) as described for FIGS. 2A-2C. An alignment layer on one or more of the overlays 330, 335, 340 and 345 aligns the liquid crystal material when the beam steering device 300 is in an unpowered state (i.e., when there is no electric field) and reduces discontinuities in the electroactive molecule/material arrangement.

The substrate(s) that couple to the overlays 330, 334, 340, 345 can be a singular, continuous substrate or composed of multiple, discontinuous substrates; each of these possible substrate layouts is sometimes collectively referred to as a 'substrate' as well. Such a substrate can also include any additional components (not shown), made of the same or different material from the substrate, needed or desired to form a sealed internal cavity 370 for holding an electroactive material. For example, the substrate can encompass or be coupled to the seals 350 that may be placed at each of the four corners of the device 300 to electrically isolate the electrode layers of the overlays 330, 335, 340 and 345 from each other, and to seal the cavity inside the device 300 for the electroactive material 365, such as a liquid crystal material. Each substrate itself can have a characteristic, fixed refractive index (e.g., from about 1.3 to about 2.5, including all values and sub-ranges in between), and be composed of materials such as Glass, PMMA (polymethyl methacrylate), a polycarbonate, quartz, fused silica, and combinations thereof. An example electroactive material within the cavity is a liquid crystal (e.g., Merck MLC-2140).

As shown in FIG. 3A, each overlay defines a plane, such that the first overlay 330 defines a plane P1, the second overlay 335 defines a plane P2, the third overlay 340 defines a plane P3, and the first overlay 345 defines a plane P4. As illustrated, the plane P4 of the fourth overlay 345 is not parallel to, and is tilted with respect to, the plane P3 of its opposite overlay 340. On the other hand, the plane P1 of the first overlay 330 is substantially parallel to the plane P2 of its opposite overlay 335. As also illustrated in FIG. 3A, the device 300 can define an optical axis 375 with respect to which the orientation of the electroactive material can be measured.

During example use of the beam steering device 300, an electric field may be applied between any set of opposing overlays (e.g., the overlays 330, 335) to induce liquid crystal rotation at a fast speed by utilizing the overdriving method. Then that electric field may be removed and another electric field may be applied to the other two opposing overlays (e.g., the overlays 340, 345), causing the liquid crystal to align along the axis of the new electric field. This can be accomplished, for example, by using a single electric source, the output of which is switched to affect generation of one electric field or the other. In some cases, two sources can be used such that both electric fields are generated/present at the same time.

In the configuration of the device 300, overdriving can be applied in two different directions (i.e., between both sets of overlays), allowing faster rotation changes in both directions as compared to the device 200 of FIGS. 2A-2C, where it is available in only one direction. The two electric fields can be present as one at any given time, in both directions simultaneously, or in a temporally overlapping manner. The two electric fields can be generated using a single source, or with a different source for each electric field.

If both electric fields are substantially equal to each other in amplitude, the liquid crystal molecules can be held at an interim rotation within their total available/permissible rotation. If one electric field is greater than the other, the liquid crystal molecules will rotate and align to a greater degree in the direction of the stronger electric field. If one electric field is slightly greater than the other, the alignment direction will be slightly more along the direction of the stronger electric field. As the stronger electric field is increased in strength relative to the weaker electric field, more rotation toward the stronger electric field occurs. By varying the relative strengths of the electric field in an analog fashion, rotation of the liquid crystal may be adjusted also in an analog fashion. Overdriving may also be used in the above described analog control, where a brief, larger-than-required voltage is applied.

If there is a homogenous alignment layer formed on overlays 330 and 335, the liquid crystal material 365 will align as shown in FIG. 3A, parallel to the planes P1, P2 of the overlays 330, 335, and along the optical axis 375. If an electric field is now applied between the overlays 340, 345, then the liquid crystal molecules 365 will still align in the same direction, but the electric field will be in addition to the alignment forces provided by the alignment layer of overlays 330, 335. If the alignment layer is not present on overlays 330, 335, the electric field between the overlays 340, 345 would perform the alignment, however some discontinuities may present themselves. In the orientation of the material 365 shown in FIG. 3A, the index of refraction of the material 365 experienced by light traveling from left to right (i.e., from the overlay 340 to the overlay 345) is at a minimum for the material 365 if polarized appropriately, and the index of refraction of the material 365 to the same light traveling from top to bottom (i.e., between the overlays 330, 335) is at its maximum.

FIG. 3B illustrates that the electric field between the overlays 340, 345 is removed, while an electric field strong enough to cause full rotation of the material 365 is applied across the overlays 330, 335, causing the molecules to align parallel to the plane P3 of the overlay 340. The index of refraction of the liquid crystal to light traveling from left to right (i.e., from the overlay 340 to the overlay 345) is now at its maximum if polarized appropriately, while the index of refraction to the same light traveling from top to bottom (i.e., between the overlays 330, 335) in the figure would be at its minimum.

FIG. 3C illustrates that the electric field between the overlays 340, 345 is removed, while an electric field strong enough to cause half rotation of the material 365 is applied across the overlays 330, 335, causing the molecules of the material 365 to align halfway between being vertically and horizontally aligned, i.e., tilted between the angles of planes P1, P3. FIG. 3C is, however, also illustrative of the state of the molecules of the material 365 when the field between the overlays 340, 345 as well as the field between the overlays 330, 335 is present, and interact to align the molecules as illustrated. The index of refraction of the liquid crystal experienced by light traveling both horizontally (i.e., from the overlay 340 to the overlay 345) and vertically (i.e., between the overlays 330, 335) is approximately equal. As illustrated in FIG. 3B, a combination of a power source 380 and a controller 385 can be used for generating and controlling application of the electric fields. The controller can be any suitable processing device configured to run and/or execute a set of instructions or code associated with operating the beam steering device 300. The controller can be, for example, a general purpose processor, a Field Programmable Gate Array (FPGA), an Application Specific Integrated Circuit (ASIC), a Digital Signal Processor (DSP), and/or the like.

Figure 4A:
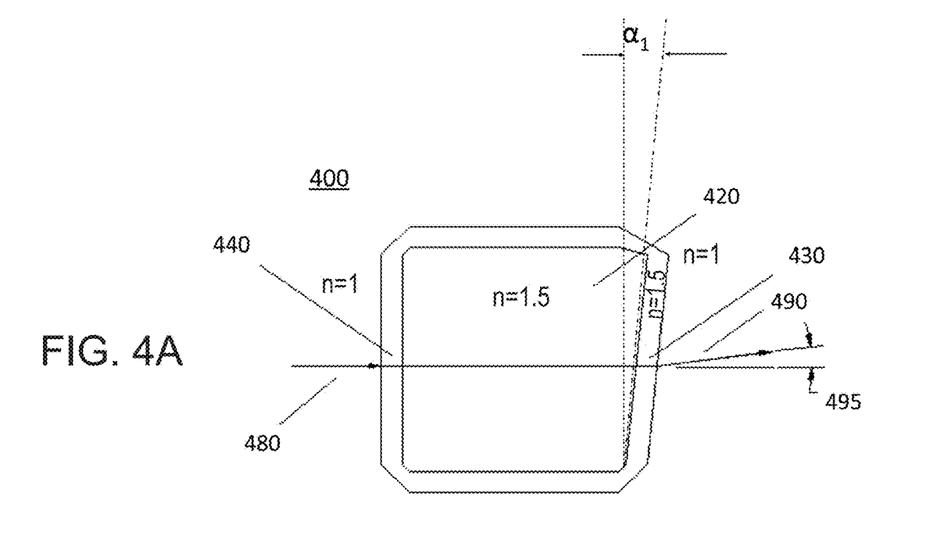
FIG. 4A illustrates the beam steering device of FIG. 3A in use, with an output beam refracted by a first degree.
Figure 4B:
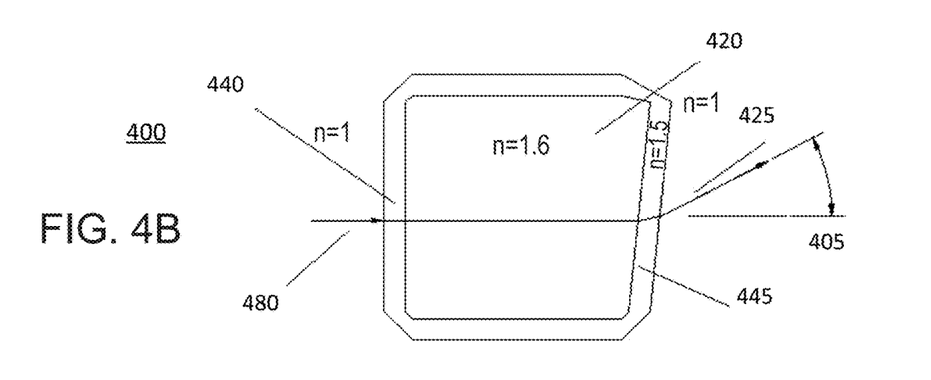
FIG. 4B illustrates the beam steering device of FIG. 3A in use, with an output beam refracted by a second degree which is greater than the first degree of FIG. 4A.
Figure 4C:
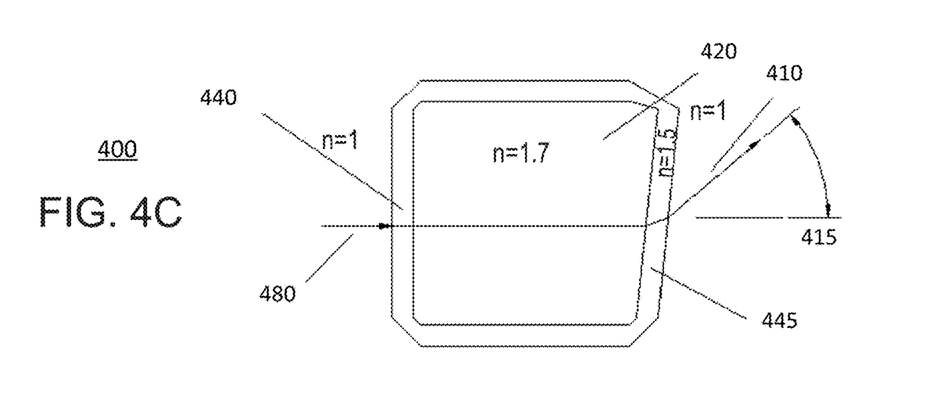
FIG. 4C illustrates the beam steering device of FIG. 3A in use, with an output beam refracted by a third degree which is greater than the second degree of FIG. 4A.

FIGS. 4A-4C illustrate how variable beam steering can be accomplished with a beam steering device 400 that can be structurally and/or functionally similar to the device 300. In FIG. 4A, the electric field is in the same condition/state as described in FIG. 3A, applied between overlays 440, 445. The index of refraction of the electroactive material (e.g., liquid crystal) inside of chamber/cavity 420 is equal to the index of refraction at the overlay 440 (which is essentially the same as the refractive index of the underlying substrate) for the incident light beam 480. The light beam 480 can be coupled into the overlay 440 in any suitable manner, including free-space coupling and the use of coupling optics such as optical fibers. Light beam 480 enters into, or is incident on, the overlay 440 perpendicular to its surface, so even though the index of refraction of the medium (typically air with an index of 1) outside of overlay 440 is less than the index of refraction at the overlay 440, no refraction of light occurs because the angle of incidence of the light onto the substrate is perpendicular. The light beam 480 can include one or more wavelengths, including visible wavelengths (e.g., from about 400 nm to about 700 nm, including all values and sub-ranges in between), UV wavelengths (e.g., from 10 nm to about 400 nm, including all values and sub-ranges in between), and IR wavelengths (e.g., from 800 nm to about 1 mm, including all values and sub-ranges in between).

The light beam 480 then travels through overlay 440 and enters the liquid crystal within cavity 420. Because the light beam 480 is still perpendicular to the interface between the liquid crystal within the cavity 420 and the overlay 440, no refraction takes place, regardless of the index of refraction of the liquid crystal. Light beam 480 travels through the liquid crystal within cavity 420 and enters the overlay 445. Although the overlay 445 is at a non-perpendicular angle of incidence to light beam 480 (i.e., is tilted at a tilt angle $\alpha_1$ with respect to the overlay 440 as illustrated), no refraction occurs because the index of refraction of the liquid crystal and the overlay 445 are equal. When light beam 80 exits the overlay 445, it encounters a different index of refraction (e.g., air again), so the angle between the exit surface of the overlay 445 and the light beam causes the light beam to be refracted at an angle 495. Input/incident light beam 480 is thus redirected into output light beam 490. Angle 495, sometimes referred to as the angle of refraction, is relatively small compared to those illustrated in FIGS. 4B and 4C, described further below.

In FIG. 4B, the electric field is in the same condition/state as described in FIG. 3B, applied between overlays 430, 435. The electric field applied is not sufficient to fully align the liquid crystal molecules to the electric field, and only partial rotation occurs. The index of refraction of the liquid crystal inside of chamber/cavity 320 is now higher than the index of refraction at the overlay 440 for the light beam 480. The light beam 480 enters into the overlay 440 perpendicular to its surface, so even though the index of refraction of the medium outside of the overlay 440 is less than the index of refraction at the overlay 440, no refraction of light occurs because the angle of incidence of the light onto the overlay 440 is perpendicular. The incident/input light beam 480 then travels through the overlay 440 and enters the liquid crystal within cavity 420. Because it is still perpendicular to the overlay between the liquid crystal within the cavity 420 and the overlay 440, no refraction takes place, regardless of the index of refraction of the liquid crystal. Light beam 80 travels through the liquid crystal within the cavity 420 and enters the overlay 445. The overlay 445 is at a non-perpendicular angle to the direction of light beam 480, and the index of refraction of the liquid crystal within cavity 420 is now higher than that of the overlay 445, resulting in refraction of the light upward at the interface between the liquid crystal and the overlay 445. When the light beam 480 exits the overlay 445, it again encounters a different index of refraction of the new medium it enters (e.g., air), so the angle between the exit surface of the overlay 445 and the light beam 480 causes the light beam to be refracted further by an angle 405. Light beam 480 is thus redirected into light beam 425. Angle 405 is larger than angle 495 in FIG. 4A because angle 405 is now the sum of the change in propagation from refraction of light that occurred at the liquid crystal-to-overlay 445 boundary, plus the refraction of light that occurred at the overlay 445-to-exit medium boundary, whereas the refraction of the light in FIG. 4A occurred only at the overlay 445-to-exit medium boundary.

In FIG. 4C, the electric field is in the same condition/state as described in FIG. 3C, applied to the overlays 430, 435. The electric field applied between the overlays 430, 435 is now stronger than the same field applied in FIG. 4B, and is sufficient in strength to fully align the liquid crystal molecules with that electric field. The index of refraction of the liquid crystal inside of chamber/cavity 420 is now even higher than the index of refraction in the condition described in FIG. 4B, and also higher than the overlay 430 for the incident/input light beam 480. Light beam 480 enters into overlay 440 perpendicular to its surface, so even though the index of refraction of the medium outside of overlay 440 is less than the index of refraction at the overlay 440, no refraction of the light occurs because the angle of incidence of the light onto the substrate is perpendicular. The light beam 480 then travels through overlay 440 and enters the liquid crystal within the cavity 420. Because the light beam 480 is still perpendicular to the boundary between the liquid crystal within the cavity 120 and overlay 440, no refraction takes place, regardless of the index of refraction of the liquid crystal. The light beam 480 travels through the liquid crystal within the cavity 420 and enters the overlay 445. The substrate 445 is at an angle to the direction of the light beam 480, and the index of refraction of the liquid crystal within the cavity 420 is now much higher than that of overlay 445, resulting in refraction of the light at the boundary between the liquid crystal and the overlay 445. Due to the higher different in refractive index between the two materials, there is more refraction than that seen in FIG. 4B. When the light beam 480 exits the overlay 445, it again encounters a different index of refraction of the new medium it enters, so the angle between the exit surface of the overlay 445 and the light beam causes the light beam to deflect at an angle 415. The input light beam 480 is thus redirected/steered into output light beam 410. Angle 115 is larger than angle 105 in FIG. 7B because angle 115 is now the sum of a greater amount of the refraction of light that occurred at the liquid crystal-to-overlay, plus the refraction of light that occurred at the substrate-to-exit medium interface.

FIGS. 4A-4C illustrate three discrete settings that result in three different values of refractive index for the liquid crystal material, resulting in three discrete angles of refraction of the output beam. However, the electric field applied to either set of overlays can be changed in an analog and continuous manner, resulting in an analog change in the amount of output beam steering that can be done. For example, one or both of the electric fields applied between the pairs of overlays can be swept such that the refractive index varies between a minimum or lower value to a maximum or higher value. The corresponding change in refractive index can be linear or non-linear. Further, the overdrive method described above can also be employed for any of the electric fields described in FIGS. 4A-4C, resulting in much faster light beam angle changing/beam steering than could be accomplished without using the overdrive method.

Figure 5A:
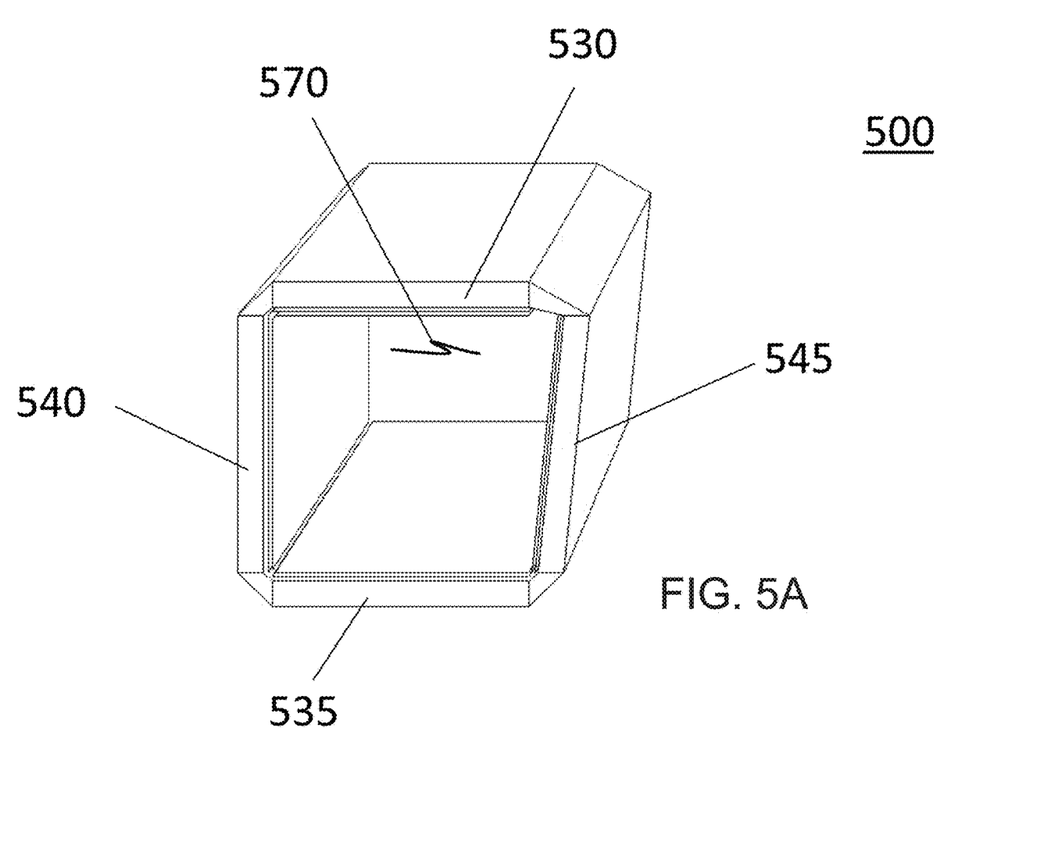
FIG. 5A is a perspective view of the beam steering device of FIG. 4A with front and back covers removed.
Figure 5B:
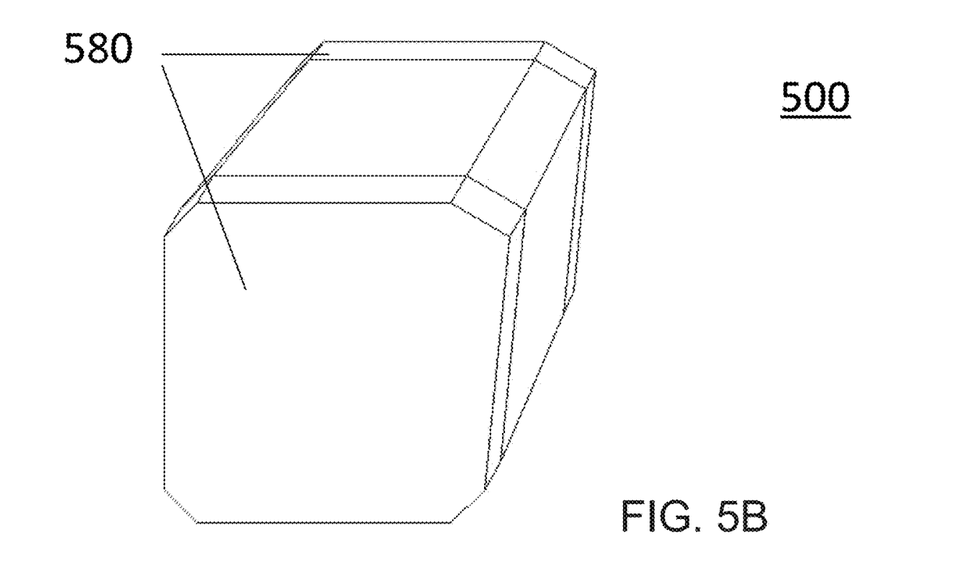
FIG. 5B is a perspective view of the beam steering device of FIG. 4A with front and back covers in place.

FIGS. 5A and 5B illustrate a 3D perspective view of a beam steering device 500 (which can be structurally and/or functionally similar to the devices 300, 400) formed as a 3D right trapezoid. The device 500 includes overlays 530, 535 with planes that are parallel to each other, and an overlay 545 having a plane that is tilted with respect to that of its opposing overlay 540. During use, the overlay 545 received an incident light beam, while the overlay 545 outputs an output light beam as explained with respect to FIGS. 3A-3C, 4A-4C. The interior of the device 500 defines a cavity 570 for holding the electroactive material. As illustrated in FIG. 5B, covers 580 may be placed at either end of the device 500 to seal the cavity 570, and at least one of the covers 580 may be removable. The distance between the overlays 530, 535, the distance between the overlays 540, 545, and/or the distance between the covers 580, can independently be from about 1 µm to about 15 µm, including all values and sub-ranges in between. The switching speed for changing the degree of refraction for any of the beam steering devices 300, 400, 500 can be from about 1 us to about 5 ms, including all values and sub-ranges in between.

As an example of comparative switching speeds, the beam steering device 200 in FIGS. 2A-2C may be able to change the orientation of the LC molecules 220 from alignment layer-orientation (FIG. 2A) to electric field-orientation (FIG. 2C) in 10 ms in overdrive. However, it takes 50 ms, upon removal of the electric field, for the LC molecules 220 to change their orientation from electric field-orientation (FIG. 2C) back to alignment layer-orientation (FIG. 2A). In contrast, the beam steering device 300 in FIGS. 3A-3C may be able to change the orientation of the LC molecules 365 from alignment layer-orientation (FIG. 3A) to electric field-orientation (FIG. 3C) in 10 ms in overdrive, similar to the device 200. However, upon removal of one electric field and application of the other (i.e., between the other pair of interfaces), the LC molecules 365 now change their orientation from electric field-orientation (FIG. 3C) back to alignment layer-orientation (FIG. 3A) more quickly, and at a similar rate due to the application of another field. So this change of orientation back to the alignment layer-orientation can also occur in about 10 ms in overdrive mode for the device 300.

Applications

An example application of such beam steering devices is for multi-axis scanning (e.g., 2D/XY, or 3D, or generally nD scanning), which can find use in various applications that would benefit from the improved beam steering speeds achieved with these devices. In such applications, two or more of these beam steering devices can be used in series/in a cascade, with a first beam steering device receiving the initial input light beam and outputting an output light beam for consumption by the next beam steering device, and so on. Each beam steering device can refract its input light beam along a different axis that each other beam steering device. For example, a first beam steering device in the cascade can receive the input light beam and output light beam as refracted along (say) an X-axis. A second beam steering device is positioned to receive this output light beam as orthogonal to its surface and refract it along (say) a Y-axis. A third beam steering device is positioned to receive this output light beam from the second beam steering device as orthogonal to its surface and refract it along (say) a Z-axis. The resulting output beam then can have specific XYZ addressability that is independently controllable for each axis.

Another example application of such beam steering devices is for multi-stage beam steering, such as for, for example, in an optical demultiplexing approach. A first stage can include a first beam steering device that can be operated to receive an incident light beam and output it as an output light beam (i.e., by selectively changing the refractive index of the electroactive material of the first beam steering device) that is refracted by discrete, predetermined amounts. For each degree of refraction that the output light beam can attain, the output light beam is coupled into a different beam steering device of a second stage, which can in turn be operated in any suitable manner depending on the application (e.g., to discard the light beam, to couple it to additional downstream optical components, etc.).

Yet another example application or use of such a beam steering device can be as a component in eyewear for generated virtual images. For example, such beam steering devices may be useful in smart contact lens, spectacle glasses, or head-mounted displays, to project a scanned image into the eye, such as in mixed or augmented reality (AR). AR devices create a virtual image that a user sees in addition to what is seen in the real world. Conventional AR devices typically include a small display screen in conjunction with reflectors or mirrors to relay the image to the eye. Adding such display screens to spectacle frames adds bulk and weight to the frames, while adding such display screens to contact lenses is impossible. The present device replaces the display screen and overcome these limitations.

In the case of using the present technology in a smart contact lens, the beam steering device can be fabricated such that the overall thickness (e.g., the distance between the overlays 540, 545 in FIGS. 5A-5B) can be less than the thickness of the contact lens, which is typically about 0.1 mm thick. This device could include the light source, beam steering device, and any collimating optics either as a single stack in line with the optical axis of the eye, or with the use of mirrors if it is desired that some components be thicker and would cause the overall device to be thicker than required. For example, the light source could project the light "sideways" or perpendicular to the eye's optical axis on the user's retina, then be redirected along the eye's optical axis and into the beam steering device. Any or all the components could be arranged perpendicular to the eye's optical axis, then redirected to the eye's optical axis with a mirror or reflecting component.

Figure 6A:
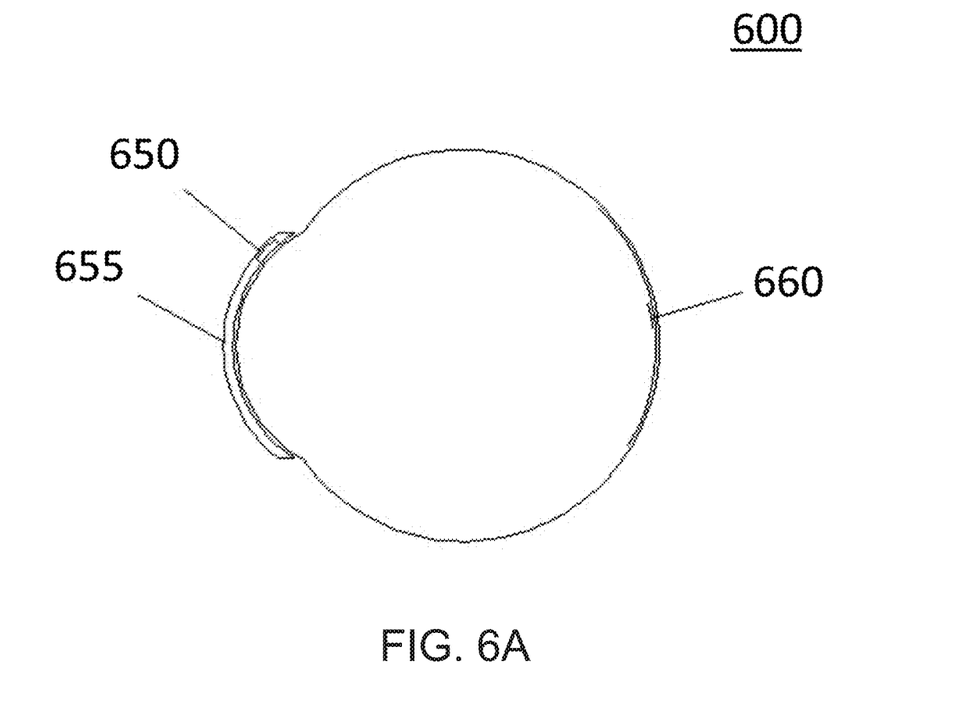
FIG. 6A illustrates a smart contact lens with a beam steering device like the one shown in FIGS. 3A-3C.
Figure 6B:
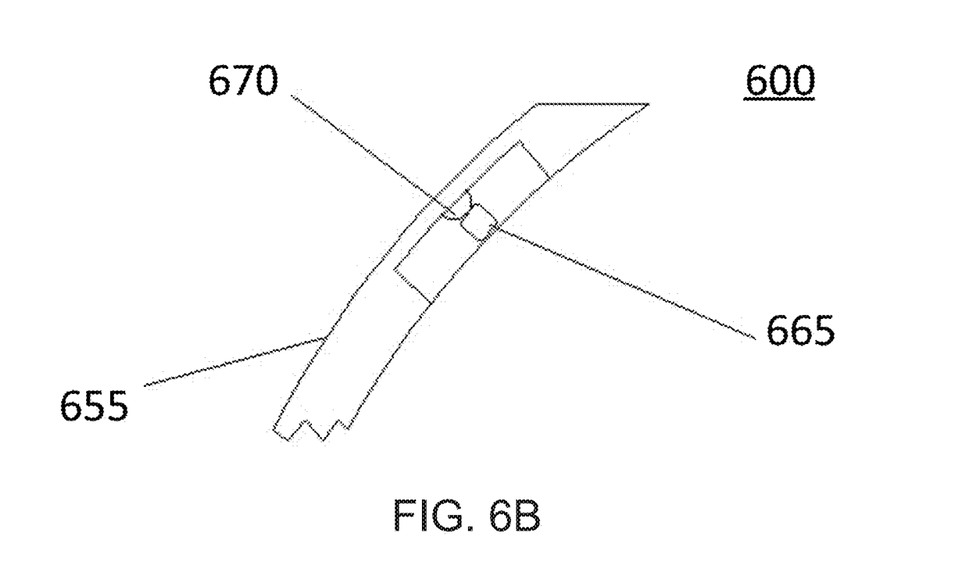
FIG. 6B is a magnified view of the portion of the smart contact lens of FIG. 6A showing the beam steering device.

FIGS. 6A-6B illustrate example use of such a beam steering device within a smart contact lens 600, though it is readily applicable to any suitable eyewear, such as any kind of lens (e.g., an intra-ocular lens), spectacles, and head-mounted displays to either project the beam directly into the eye, or project the beam onto a surface outside of the eye to paint/display the image. Here, the lens 655, in which a light source 670 and beam steering device 665 (which can be structurally and/or functionally similar to the devices 300, 400, 500) are embedded, coupled to, and/or formed as a stack 665 embedded at location 650. The light source 670 can be configured, with or without coupling optics, to generate a light signal as a spot (e.g., of image or video data) for projection on the retina 660 of the user. The light signal can be generated, for example, based on data received from a remote source, such as via an antenna coil or other network interfaces that is embedded or coupled to the lens 655. A combination of a power source and a controller, either of which may be embedded in or coupled to the lens 655, can be used for controlling operation of the source 670 and the beam steering device 665, and particularly for controlling generation of the light signal based on the received data. In addition to the beam steering device being controlled by the controller to steer the beam, the controller could also switch the light source on and off so as to create individual points of light rather than continuous lines being painted. For clarity, one beam steering device is illustrated, but two or more can be stacked in sequence as described above.

Then the beam steering device 665 can receive the light signal from the source 670 directly or via coupling optics and steer/scan the spot around to paint an image, or to render a video, on the retina 660, as described for FIGS. 3A-3C, 4A-4C, and similar to how CRT television tubes painted an image onto a phosphorous screen. As described above, more than one beam steering device 665 can be employed to accomplish 2D scanning of the image/video onto the retina 660. The orientation of the tilted surfaces can be positioned such that one device would steer the beam in one direction while the other device steers the beam in the other direction, and can be generally orthogonal to each other. The power source and the controller can control generation of the electric fields of the beam steering device 665 for manipulating the refractive index of the electroactive material within the beam steering device 665.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A beam steering device, comprising:
a first substrate defining a first inner surface of a cavity;
a second substrate opposite the first substrate and defining a second inner surface of the cavity, the second inner surface being opposite the first inner surface and tilted with respect to the first inner surface at a tilt angle;
an electroactive material, disposed within the cavity and having a variable refractive index;
a first overlay, coupled to the first substrate and defining a first plane parallel to the first inner surface, to receive an incident light beam orthogonal to the first plane and to couple the incident light beam into the electroactive material via the first inner surface; and a second overlay coupled to the second substrate and defining a second plane tilted with respect to the first plane at the tilt angle, to receive the incident light beam from the electroactive material via the second inner surface and to output, after refraction, the incident light beam as an output light beam.

2. The beam steering device of claim 1, wherein the tilt angle is less than about 1 degree.

3. The beam steering device of claim 1, wherein the tilt angle is between about 1 degree and about 60 degrees.

4. The beam steering device of claim 1, wherein the cavity has a trapezoidal cross section.

5. The beam steering device of claim 1, wherein the first overlay and the second overlay include respective electrode layers formed of electrically conductive and substantially optically transparent material, to apply an electric field to the electroactive material in a direction perpendicular to the first plane, the electric field causing the variable refractive index of the electroactive material to change.

6. The beam steering device of claim 5, wherein the electric field is a first electric field, and further comprising:
 a third overlay defining a third plane orthogonal to the first plane; and
 a fourth overlay defining a fourth plane parallel to the third plane,
 wherein the third overlay and the fourth overlay include respective electrodes to apply a second electric field to the electroactive material in a direction parallel to the first plane, the second electric field causing the variable refractive index of the electroactive material to change.

7. The beam steering device of claim 6, wherein the respective electrodes of the third overlay and the fourth overlay are configured to apply the second electric field to the electroactive material while the respective electrodes of the first overlay and the second overlay apply the first electric field to the electroactive material.

8. The beam steering device of claim 6, wherein the respective electrodes of the third overlay and the fourth overlay are configured to overdrive the electroactive material with the second electric field in the direction parallel to the first plane while the respective electrodes of the first overlay and the second overlay are configured to overdrive the electroactive material with the first electric field in the direction perpendicular to the first plane.

9. The beam steering device of claim 6, further comprising:
 insulating material to seal the electroactive material in the cavity and to insulate the first overlay, the second overlay, the third overlay, and the fourth overlay from each other.

10. The beam steering device of claim 6, wherein the electroactive material comprises liquid crystals, and wherein at least one of the first overlay, the second overlay, the third overlay, and the fourth overlay comprises an alignment layer to anchor the liquid crystals.

11. The beam steering device of claim 10, wherein each of the first overlay, the second overlay, the third overlay, and the fourth overlay includes a corresponding alignment layer to anchor the liquid crystals.

12. A contact lens comprising the beam steering device of claim 1.

13. Eyewear comprising the beam steering device of claim 1.

* * * * *